United States Patent
Lange

[15] 3,696,725
[45] Oct. 10, 1972

[54] ADJUSTABLE CAMERA-OBJECTIVE

[72] Inventor: Karl Heinz Lange, Ennigloh, Germany

[73] Assignee: Balda-Werke Photographische Gerate und Kunststoff R. Gruter Kommanditgesellschaft, Westphalia, Germany

[22] Filed: Dec. 31, 1969

[21] Appl. No.: 889,667

[30] Foreign Application Priority Data

March 6, 1969  Germany..........P 19 11 372.5

[52] U.S. Cl. ....................95/45, 350/252, 350/255
[51] Int. Cl. ..................................................G03l 3/02
[58] Field of Search ...................95/45; 350/252, 255

[56] References Cited

UNITED STATES PATENTS 1,720,224  7/1929  Lessler et al....................95/45
3,220,308  11/1965  Lareau .........................95/45

Primary Examiner—Samuel S. Matthews
Assistant Examiner—E. M. Bero
Attorney—Sparrow and Sparrow

[57] ABSTRACT

A camera-objective is provided with at least one adjustable lens supported by guiding and supporting means, which engages thread-like surfaces which are oblique to the axis of lens or the axis of camera objective so that the lens can be shifted along said axis by a rotary motion for adjustment. The thread-like surfaces are formed by fixed inclined planes provided with cam notches, which are engaged by at least one detent provided on said guiding means, so that stepped shift movement of the adjustable lens along the axis of the camera objective is possible, by the detent dropping into one notch after the other notch when a predetermined force of rotation, transferred to the adjustable lens is exceeded.

8 Claims, 4 Drawing Figures

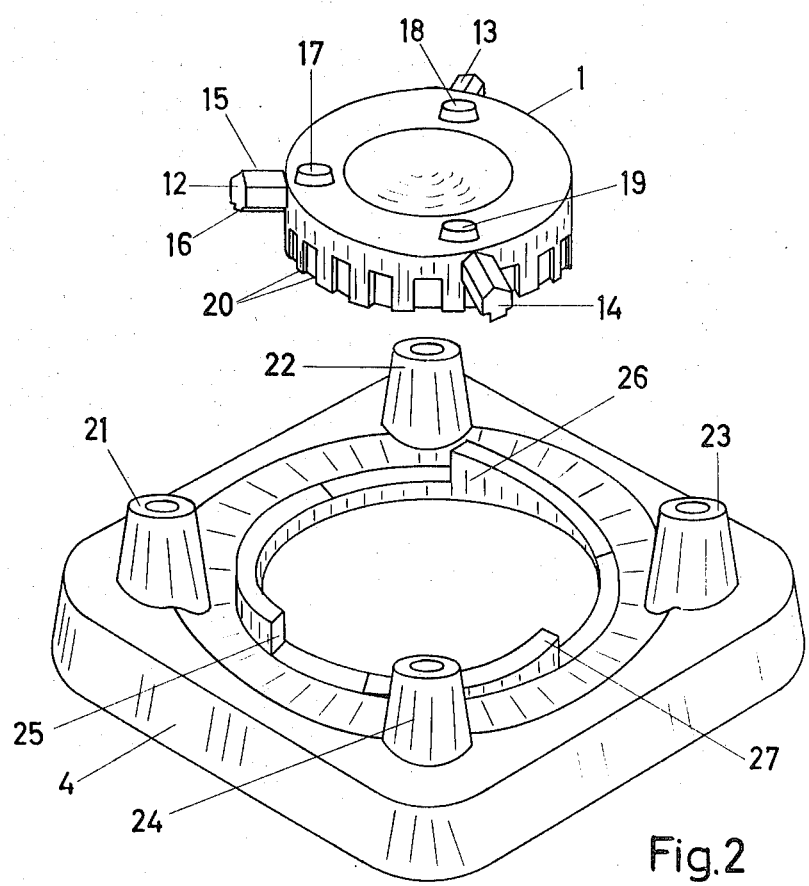
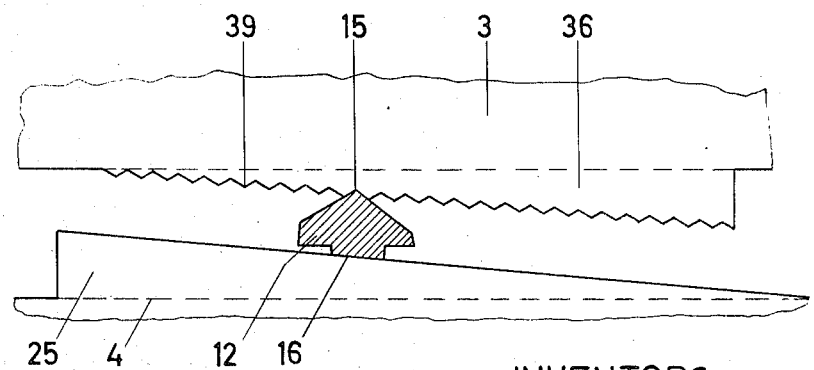
Fig. 2
Fig. 4

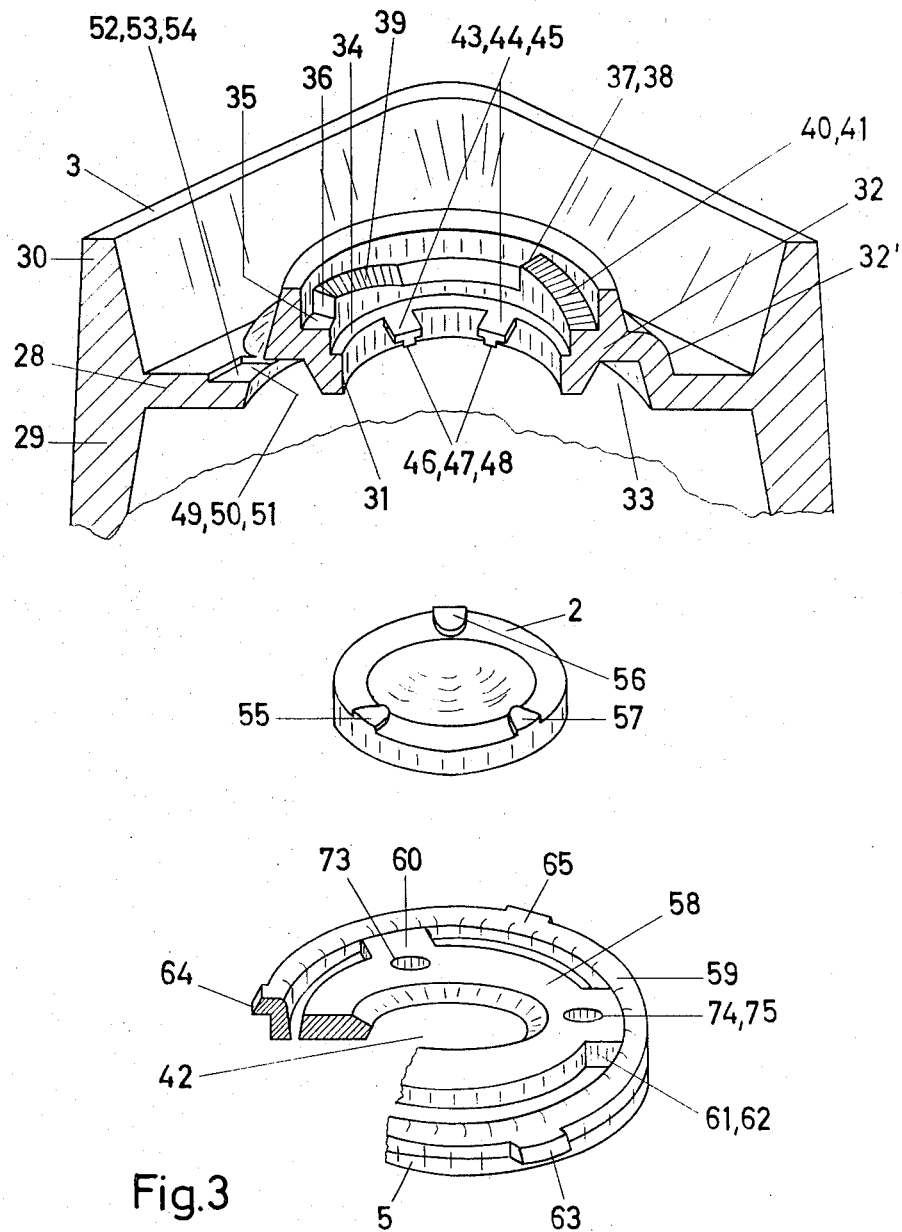

ADJUSTABLE CAMERA-OBJECTIVE

BACKGROUND OF THE INVENTION

In general an adjustment of camera objectives is necessary after the camera has been completely assembled. This adjustment is normally effected by a sliding movement of at least one of the lenses of the objectives along the axis of the objective.

This adjustment can be obtained in cameras with a distance focussing device by an appropriate basic calibration of said distance focussing device. This method however is fairly difficult and complicated to perform because of the interference of the adjustment means with the distance focussing device. The work of adjustment is essentially simplified, when at least one lense is mounted in-side the camera in such manner, that this lense can be shifted along the axis of the camera objective by a rotary motion for a single pre-adjustment, as is usual in many cases today, and that this setting is provided without interference with the distance focussing device.

The adjustable lens is provided in a camera objective of this art with guiding or sliding means on the periphery thereof, which means engage threadlike guide surfaces being oblique to the axis of objective and being integral with or part of a second lens, which spring means are provided pressing the guiding means of the first lens against the guiding surfaces of the second lens. However these known objectives are restricted first and foremost to at most two-part camera objectives, because embodiments of this sort constituting a higher number of lenses would be too expensive and too complicated in construction. Furthermore they would require a high amount of manual adjustment and there would be a good chance of accidental readjustment. Therefore, the embodiments mentioned above do not meet the requirements of modern mass production.

SUMMARY

The present invention is an advantageous further development and above all an improvement of the known camera objectives. The advantages of the invention become particularly effective when the lens and their holding means, for example the lense mount holders, are made of plastic material. Moreover the camera objective of the present invention is advantageous for photographic cameras, in which no distance focussing device is provided but wherein a fixed predetermined focussing is established, which focussing produces well focussed pictures for all distances occuring in practical use, for instance for distance in the range from 1.8 meters (6 feet), to infinity, as is particularly usual today in cheap cameras.

It is a particular object of the invention to provide a camera objective which may be constructed as a single lens or multiple lens objective, for reducing the costs of both production and material and amount of manual adjustment required.

Based upon the known adjustable camera objectives, in which at least one lens can be shifted along the axis of the objective, the present invention comprises inclined planes in stationary position on the holding parts for the objective lenses, at least one of said plans being provided with a plurality of cam notches radially extending from the adjustable lens and further comprises at least one detent positioned on guiding means engaging said inclined planes, which detent engages one of the notches and enables a stepped shift movement of the adjustable lens along the axis of the camera objective by means the detent stepping from notch to notch when a certain predetermined rotational force applied to said adjustable lens is exceeded.

The low production costs of the novel construction of a camera objective are essentially obtained by the feature, that the locking of the adjustable lens is effected only by the detent or detents engaging the notches and is not effected by locking rings or the like as is usual is known camera constructions. Fixing of the position of the lens after final adjustment by means of lacquer, as is also usual in the known cameras, is not necessary in the present invention, because the rotational force necessary for causing a rotary motion of the lens can be set sufficiently high so that the adjustment can only be performed with a special tool, so that the user of a camera provided with the objective according to the present invention can not alter the adjustment manually by ignorance or through carelessness. Furthermore the invention permits the use of inexpensive, easily fabricated and assembled component parts made from plastic material, particularly for the lens holding and supporting means and for the lenses themselves.

A particularly advantageous embodiment of the invention is obtained, when the inclined planes are arranged in pairs obtained, when the inclined planes are arranged in pairs in such manner, that the planes of each pair opposing each other and being parallel to each other at a certain distance form a threadlike guiding channel which is oblique to the axis of the camera objective and which is engaged by at least one guiding means of the adjustable lens. In this embodiment the surface of at least one inclined plane of each pair is provided with the notches extending radially of the adjustable lense.

For a particularly simple assembly it is very advantageous to provide two separate holding parts in parallel relationship to one another at a certain distance from each other for supporting the adjustable lens. Both holding parts have their surfaces opposing each other with the inclined planes arranged around the light-admitting openings of the holding parts. Also in this construction the inclined planes meet each other in pairs and form guide channels after the two holding parts have been assembled.

The holding parts with the inclined planes thereon are constructed in this embodiment of the invention in such manner that the inclined lanes of at least one holding or supporting part resiliently abuts the guiding means of the adjustable lens and presses these guiding means against the inclined planes of the other holding part.

The guiding means of the invention are realized in a particular embodiment by guiding arms, which are mounted on the periphery of the lens and extend radially of said lens.

Preferably there are three arms mounted on the periphery of the lens which arms are staggered at 120° and cooperate with three pairs of inclined planes provided on the holding parts. Each one of these arms is provided with a smooth bearing surface on one side of the lens, which surface is oblique to the axis of the lens corresponding the angle made by the inclined surfaces against this axis. A second bearing surface of each arm, which surface is positioned on the other side of the lens, is executed as a projection having a triangular cross-section.

The radially extending edges formed by this projection serve as detents engaging the notches of the inclined planes. In order to simplify the adjustment of the camera objective after assembly, the lens positioned on the front of the objective, that is on the side of the objective being furthest from the film, is adjustably supported in the manner characterized by the present invention. In this embodiment of the invention the adjustable lens is further provided with a knurled edge on the periphery of the lens, which edge remains accessible after final assembly of the camera and enables the rotary motion of the objective for adjustment by a special adjustment tool engaging said knurled edge. It may be noted, that in a very advantageous manner the guiding arms and the knurled edge are made integral with the lens when this lens is made from plastic material. When however, the lens is made of glass, supporting means or frames are provided having the guiding arms and the knurled edge. These supporting means are preferably made of resilient plastic material, so that the lenses can be attached within the opening of these supporting means by the peripheries thereof engaging grooves provided on the inner edges of said openings.

In a preferred embodiment of the invention the two holding parts supporting the adjustable lens constitute a tube which has a bottom on its front side for supporting the lenses, and has a decorative or front plate, whereby the adjustable lens is positioned between said tube and said front plate. The inclined planes forming the threadlike guiding channels for the guiding arms are disposed around both an opening in the bottom of the tube and an opening in the front plate which openings conform to each other. The shape of the front plate and the material of this front plate is selected in this embodiment of the invention in such manner, that the front plate is resilient at least around its opening, in which the adjustable lens is positioned, in the direction of the lens axis. Furthermore the lateral dimensions of the front plate are selected in such manner, that this plate is held on the tube by way of friction or by a press fit during the assembly until this plate is secured by screws after final assembly of the camera objective. In a multiple lens system these screws secure and fix at the same instant the other lenses or the supporting and holding parts for these lenses on the above mentioned bottom of the tube. In such a construction the additional lenses of the adjustable lens are held by locking rings, by friction or by a press fit during assembly until the screws securing the front plate have been fastened.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawings, in which FIG. 2 is a perspective view of the front lens of the first pair of lenses and of the front plate arranged in the position ready for assembly, FIG. 3 shows the tube together with the second lens of the first pair and the locking ring of this lens in a partly sectioned drawing, all parts being in a position ready for assembly, FIG. 4 shows one of the guiding arms of the front lens in a cross-section with a pair of inclined planes abutting said arm.

DESCRIPTION OF THE PREFERRED EMBODIMENT

Figure 1:
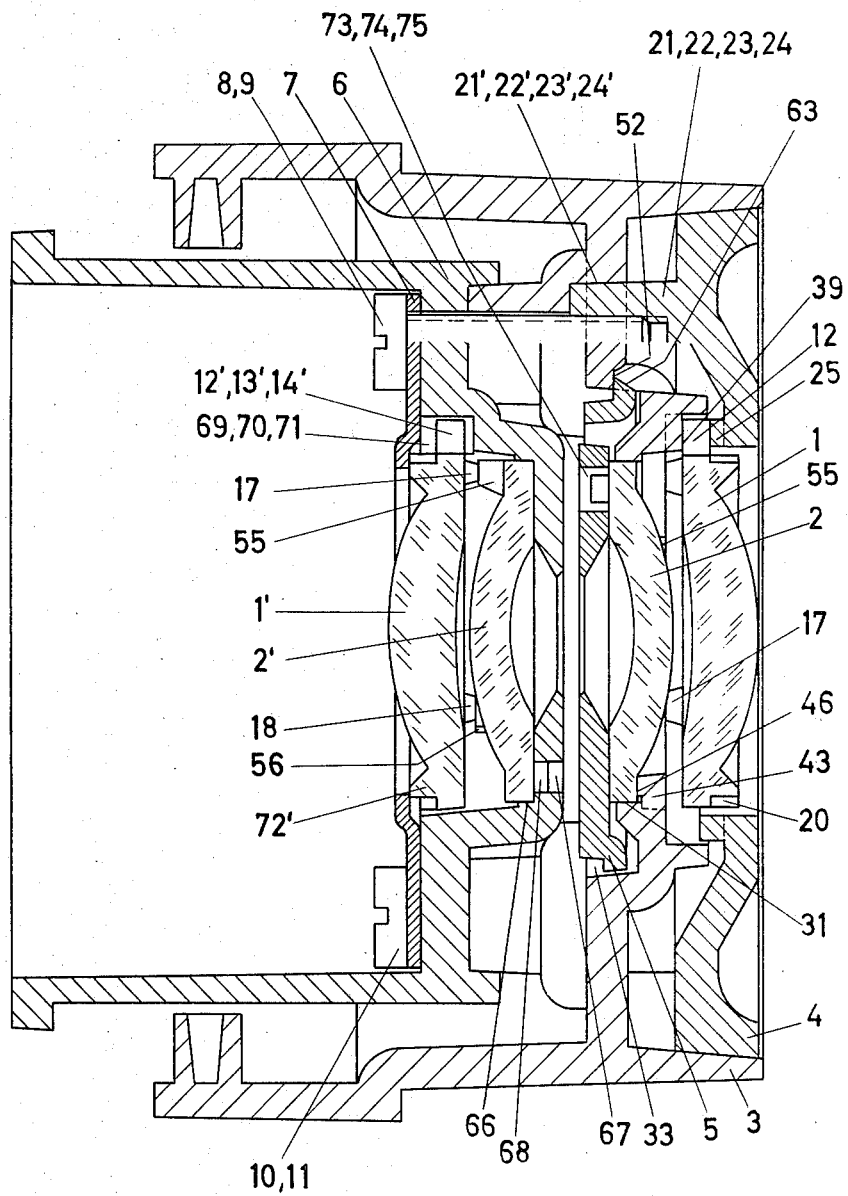
FIG. 1 shows a longitudinal section view of a four-lens camera objective having two symmetrical pairs of lenses.

In FIG. 1 the numerals 1 and 2 denote the first pair of lenses, which pair is positioned inside a holding part comprising the tube 3, the front plate 4 and the locking ring 5. The second pair comprising the lenses 1' and 2' is positioned inside a holding part consisting of the light tunnel 6 and of a supporting plate 7. Holding parts 3, 4, 5 and 6, 7 are fixed together by the four parts 8, 9, 10 and 11. Front lens 1 (FIG. 2) has three guiding arms 12, 13, 14 being integral with said lens and being staggered by 120°, which arms have a detent 15 with a triangular cross-section and a second inclined surface 16. Furthermore the front lens 1 has abutments 17, 18, 19 positioned on the outer ringlike surface of said lens near the base of said guiding arms and has further a knurled surface 20 on its periphery. The decorative plate or front plate 4 has four sockets 21, 22, 23, 24 at the corners of said plate and has three inclined planes 25, 26, 27 having a smooth upper surface, which planes are staggered by 120° and positioned along the edge of a centrally positioned and conical recess.

In the FIG. 3 tube 3 is shown in a sectioned view. This tube has a bottom part 28 and a collar 29, which is extending at 30 to the front part of tube 3. The cylindrical opening 31 in the bottom part 28 has a stepped cylindrical collar 32. In the area of collar 29 of tube 3, cylindrical collar 32 has a circular recess 33, which has a trapezoidal cross-section. On the other side of bottom-part 28, radial ring surfaces 34 and 35 are formed in collar 32. Three inclined planes 36, 37 and 38 are staggered by 120° along the edge of the cylindrical opening 31 on ring surface 35, which inclined planes are provided with notched surfaces 39, 40, 41 (FIG. 4). On the inner side of cylindrical opening 31 three pairs 43, 44, 45 of locking noses are staggered by 120°, which have bearing surfaces 46, 47, 48 on their undersides. Openings 49, 50, 51 are obtained by recesses 32', which are provided at three points along circular cylindrical called 32 staggered by 120°. Abutting surfaces (sealing or centering surfaces) are provided on the two parts of the extrusion die used for the production of the tube, so that these points can not be filled by the molding material and leave the openings 49, 50, 51, after the extrusion die has been removed from the workpiece. Recesses 52, 53 and 54 are associated with the openings 49, 50, 51. Furthermore lens 2 of the first pair of lens is shown in FIG. 3, which lense is has three locking noses 55, 56 and 57 staggered by 120°. A lens locking ring 5 is also shown in FIG. 3, which ring has an outer circular part 59 and an inner circular part 58 which parts are connected to each other by the three lugs 60, 61, 62. Inner circular part 58 has an opening serving as the aperture of a diaphragm and having for this purpose the necessary diameter. Outer circular part 59 has three locking noses 63, 64, 65 distributed equally along the periphery of said outer part, and inner part 58 has three openings 73, 74, 75 for the locking noses 68 of lenses 2,2' respectively.

For assembling of the camera objective lens 2 is first mounted in opening 31 of tube 3 in such manner that each one of locking pins 55, 56, 57 is positioned between two locking noses of one pair 43, 44 or 45. Thereafter locking ring 5 is pressed into opening 31 so that locking noses 63, 64, 65 of said ring extend through openings 49, 50, 51 and are positioned behind the bottom of recesses 52, 53, 54 (FIG. 1). Locking ring 5 is preferably made from ductile, resilient plastic material, so that outer circular part 59 can be pressed against inner part 58.

A strong tightening of lens 2 against bearing surfaces 46, 47, 48 can be achieved by proper dimensions and by proper positioning of lense 2 and locking surfaces 46, 47 and 48 (FIG. 1).

In a subsequent working step front plate 4 is pressed into the front recess of tube 3, the lateral dimensions of the recess being made relative to the lateral dimensions of front plate 4 in such manner, that a press fit of component parts 3 and 4 is obtained. In a modified embodiment of the invention this press fit is effected by screw sockets 21 to 24 engaging openings 21' to 24'. Lens 1 is prevented from dropping out of the objective during the further assembly by being held between inclined planes 39, 40, 41 and 25, 26, 27 of front plate 4 and tube 3, respectively.

In the next process step lens 2' is pressed into the lens fitting 66 of light tunnel 6 (FIG. 1), where lens 2' is held by means of the pin 68 in the desired position. Thereafter lens 1' is mounted with its three integral guiding arms 12', 13', 14' in recesses 69, 70, 71 provided for this purpose inside light tunnel 6. The above mentioned position of locking means 67, 68 of lens 2' ensures that abutments 17, 18, 19 of lens 1' abut locking pins 55, 56, 57 of lens 2' at all events, so that a reliable and well defined positioning of these two latter lenses is obtained.

After holding plate 7 has been pressed into light tunnel 6, lenses 1' and 2' are prevented from dropping out of said tunnel because of the outer edge 72' of lens 1' engaging said holding plate 7, the lateral dimensions of which are adapted to the diameter of the light tunnel in such manner, that a press fit of the two parts 6 and 7 is obtained.

Thereafter the two lens holding parts 3, 4, 5 and 6, 7 provided with lenses 1, 2, 1', 2' can be assembled and screwed together by the four screws 8, 9, 10 and 11.

For the adjustment of front lens 1 an appropriate tool is brought into engagement with knurled edge 20. When the torsion force transmitted by said tool to the adjustable lens exceeds a predetermined value, detents 15 step over the projections of cam notches 39, 40, 41 (FIG. 4), and guiding arms 12, 13, 14 are moved between inclined planes 25, 26, 27 and 39, 40, 41 until a checking device (not shown) indicates the correct lens setting. Contrary to lenses 1' and 2' lenses 1 and 2 must be rotationally shiftably mounted relative to each other in such manner, that abutments 17, 18, 19 of lens 1 do not engage locking noses or pins 55, 56, 57 of lens 2 at adjustment process. This required rotationally shifting facility is automatically obtained by lens 2 being fixed in a desired position by locking pins or noses 55, 56, 57 engaging the pairs of locking noses 43, 44, 45 of tube 3, in which position abutments 17, 18, 19 and locking pins 55, 56, 57 can not engage each other during rotary motion providing lens 1 had been properly mounted in the above mentioned manner.

It can be seen, that the present invention, which is not limited to the special embodiment disclosed above, provides a very simple and effective lens adjustment, which has remarkable advantages in connection with the highest precision production.

What I claim is:

1. An adjustable camera objective for adjusting the focus of said camera comprising, in combination, at least one lens shiftably disposed along the axis of said objective for varying said focus; at least one holding part for supporting said lens; thread-like inclined planes positioned stationarily on said holding part, said planes being arranged at an angle to the axis of said lens, at least one of said planes having cam notches radially extending from the axis of said lens; guiding means on said lens for movement along said inclined planes upon a rotary motion of said lens, said guiding means having a least one detent selectively engaging one of said cam notches and moved from one notch to another notch for step-wise shifting of said lens along the axis of said objective when a predetermined rotary force applied to said lens has been exceeded.

2. An adjustable camera objective according to claim 1, said inclined planes being arranged in pairs, the planes of each pair being positioned parallel to one another and at a certain distance from one another, constituting threadlike guiding channels arranged at an angle to said axis of said lens between each pair, said cam notches being formed on one of said pairs of planes and at least one of said guiding means of said adjustable lens disposed for engaging each one of said notches.

3. An adjustable camera objective according to claim 2, wherein two separate holding parts are disposed in parallel relationship to one another, said parts disposed for supporting said adjustable lens between facing surfaces of said holding parts, said facing surfaces including inclined planes opposing one another, said inclined planes positioned in parallel relationship to one another and in pairs, said guiding notches, being formed on one of said pairs of inclined planes and at least one of said two holding parts consisting of a resilient material for permitting said one of said holding parts to abut resiliently against said guiding means for pressing said guiding means against the opposing inclined plane of the other holding part.

4. An adjustable camera objective according to claim 3, one of said holding parts comprises a tube, said tube supporting said lens and having a bottom having a first cylindrical opening therein, and the other of said holding parts comprises a front plate having a second opening aligned with said first opening, said front plate having three inclined planes spaced along the edge of said second opening by 120°, and said front plate and said tube being fixed together and having said inclined planes opposing each other in pairs and constituting said threadlike guiding channels.

5. An adjustable camera objective according to claim 4, wherein said inclined planes on the surface of said tube are spaced along the edge of said first opening and have cam notches for engagement with said detents of said guiding means of said adjustable lens.

6. An adjustable camera objective according to claim 4, wherein said front plate abuts resiliently against said guiding means around said second opening.

7. An adjustable camera objective according to claim 4, said guiding means comprising three radially extending guiding arms being staggered by 120° on the periphery of said lens, said arms having on one side of said lens a smooth bearing surface being oblique relative to the inclination of said inclined planes and having on the other side of said lens a projection with triangular cross-section and said projections constituting said radially extending detents of said guiding means, said detents being arranged so as to engage said cam notches of said inclined planes.

8. An adjustable camera objective according to claim 1, said shiftable lens having a knurled edge for engagement with a tool to provide the rotary motion of said lens for adjustment after completed assembly of said objective.

* * * * *